US008099272B2

(12) United States Patent
Conway

(10) Patent No.: US 8,099,272 B2
(45) Date of Patent: Jan. 17, 2012

(54) MULTI-LAYERED MODEL FOR SURVIVABILITY ANALYSIS OF NETWORK SERVICES

(75) Inventor: Adrian E. Conway, Weston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 953 days.

(21) Appl. No.: 11/954,706

(22) Filed: Dec. 12, 2007

(65) Prior Publication Data

US 2009/0157371 A1  Jun. 18, 2009

(51) Int. Cl.
  *G06F 9/44* (2006.01)
(52) U.S. Cl. ......................................................... 703/21
(58) Field of Classification Search ...................... 703/21
  See application file for complete search history.

(56) References Cited

U.S. PATENT DOCUMENTS

| | | | | |
|---|---|---|---|---|
| 6,718,535 | B1 * | 4/2004 | Underwood | 717/101 |
| 7,620,535 | B2 * | 11/2009 | Shevenell et al. | 703/13 |
| 2004/0186701 | A1 * | 9/2004 | Aubin et al. | 703/13 |
| 2008/0262991 | A1 * | 10/2008 | Kapoor et al. | 706/20 |

OTHER PUBLICATIONS

CACI Products Company, Nov. 1996, COMNET III Tutorial, A Detailed Guide to Modeling Networks with COMNET III, p. 1-217.*
William M.K. Trochim., "Descriptive Statistics"., http://www.socialresearchmethods.net/kb/statdesc.php, 2006.*

* cited by examiner

*Primary Examiner* — Paul Rodriguez
*Assistant Examiner* — Eunhee Kim

(57) ABSTRACT

A system and method of using a multi-layered network model for analyzing the survivability of network services. The model is defined in terms of layers, connections, entities, physical processing elements, physical network elements, and physical infrastructure elements. Network services are modeled by sets of communicating entities at the application layer that are connected by connections at the underlying layers. The generality of the model constructs enable the construction of models of complex networks and services that can involve multiple layers of communication protocols, network elements, processing elements, and failover/backup mechanisms. The service survivability of a network is analyzed by projecting the failure of a set of physical elements onto the model and then determining the proportion of service affected at the application layer.

20 Claims, 6 Drawing Sheets

MULTI-LAYERED MODEL FOR SURVIVABILITY ANALYSIS OF NETWORK SERVICES

BACKGROUND INFORMATION

Conventionally, probabilistic models and software tools based thereupon have been used to quantify the reliability of networks and network services for engineering design and network planning. Such models take into account, for example, hardware/software failures and link/node processes using mathematical processes such as renewal processes, Markovian models, Markov chains, Markov processes, and combinatorial reliability. Many natural or man-made events can also lead to system and service failures. Such events, however, are difficult to model and/or quantify mathematically. Examples of such events may include hurricanes, meteor strikes, ice storms, tornadoes, earthquakes, unforeseen catastrophic software events, terrorist/criminal attacks, and combinations thereof. Although such events are unlikely and combinations thereof are even more unlikely, such events can still occur. As society becomes increasingly dependent upon networks and network services (e.g., internet service, video service, cellular service, messaging services, E911, etc.) it is becoming increasingly desirable to design and build networks and network services to survive combinations of failures despite their unlikelihood.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method in accordance with exemplary embodiments may include providing a multi-layered network model of a data communications network that represents network elements and network services of the data communications network, projecting the failure of one or more network elements onto the multi-layered network model, and determining the affect on network services caused by the failures.

The description below describes a multi-layered system and method for analyzing the survivability, and conversely, the failure of a network using a network model. References may be made to a network model with two layers: a physical layer and an application layer. It should be noted that any reference to a specific number of layers is merely exemplary and non-limiting. The concept of breaking a system down into multiple layers may follow the layering in the International Standards Organization (ISO) Open System Interconnection (OSI) Reference model. The OSI has seven layers, but the multi-layered design disclosed herein may have more or less than seven layers, but, at a minimum, includes two layers (i.e., a physical layer and an application layer).

The description below describes elements of a communications network that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The description below also describes physical and logical elements of a communications network, some of which are explicitly shown in figures, others that are not. The inclusion of some physical elements of a network system may help illustrate how a given network may be modeled. It should be noted, however, that all illustrations are purely exemplary and that the network survivability analysis described herein may be performed on different varieties of networks which may include different physical and logical elements.

Figure 1:
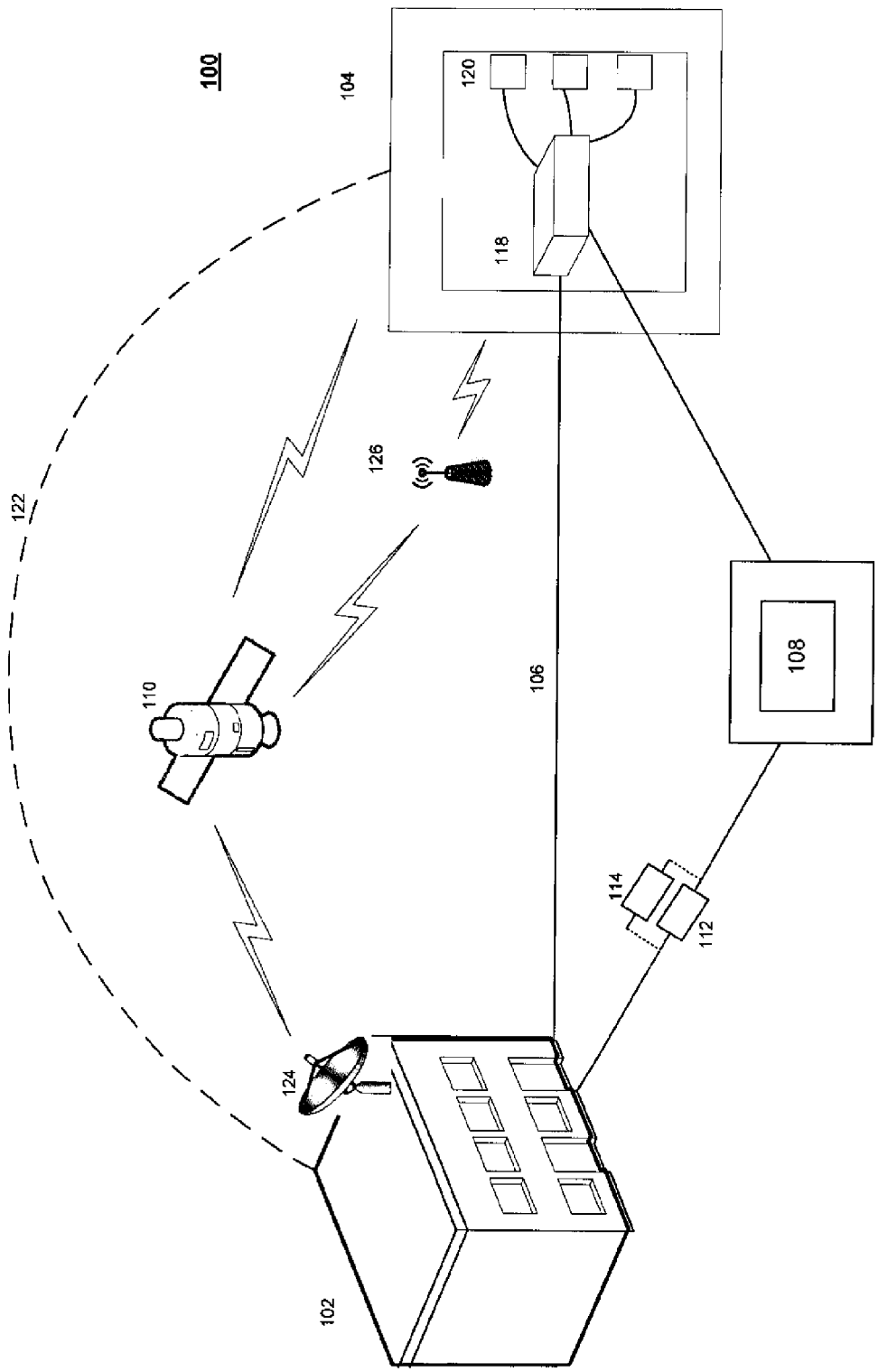
FIG. 1 is a general overview of a topology of an exemplary communications network.

For instance, network 100 from FIG. 1 illustrates a simplified view of a data communications network and various elements in a data communications network. It is noted that other hardware and software not depicted may be included in network 100. It is also noted that network 100 only illustrates a single server entity 102 and a single user entity 104. It will be appreciated that multiple instances of these entities may be included in a network. Further, it is noted that network 100 only illustrates three communication paths (i.e. direct connection 106, connection through the indirect routing entity 108, and a connection through satellite 110. It will be appreciated that multiple instances of these communication paths, and other types of communication paths, may be included in a network. In addition, the communication paths can be wired, wireless or a combination thereof.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof.

FIG. 1 illustrates an overview of the topology of an exemplary network 100, in accordance with exemplary embodiments. As illustrated, a server entity 102 and a user entity 104 may communicate with one another in some capacity. For example, the network 100 includes three paths that data can travel between the server entity 102 and the user entity 104. The first communication path is by means of a single, direct connection 106 that runs directly from the server entity 102 to the user entity 104.

Data may also travel over a satellite medium through one or more satellites 110. The server entity 102 may include a satellite dish 124 for transmitting data to the satellite 110 and receiving data from the satellite 110. Server entity 102 could alternatively use another mechanism for transmitting and receiving satellite data. The satellite 110 may communicate directly with the user entity 104, or may transmit data to a wireless receiver and transmitter device 126. The wireless receiver and transmitter device 126 may be a base station or a tower. The wireless receiver and transmitter device 126 may send and receive communications signals from the user entity 104. It is noted that network 100 only illustrates a single satellite 110 and a single wireless receiver and transmitter device 126. It will be appreciated that multiple instances of these type of network elements may be included in a network.

Data may also travel through the indirect routing entity 108. Although it is not necessarily shown to scale in the drawing, the geographic distance between server entity 102 and indirect routing entity 108 may be substantial. The transmission channel between these two entities may therefore be equipped with one or more data repeating entities 112, which are sometimes referred to as relays or repeaters. There may be a backup repeating entity 114 that may be operable to transmit data between server entity 102 and indirect routing entity 108 in the event that repeating entity 112 becomes non-operational. It is noted that network 100 only illustrates a single indirect routing entity 108 and a single repeating entity 112 with a single back-up repeating entity 114. It will be appreciated that multiple instances of these entities may be included in a network User entity 104 could be a home, an office, a dormitory, or any other structure where users use network communications services. Alternatively, the user entity 104 could be a single person using a laptop, PDA, cellular phone, or any other electronic device operable to communicate over a network. Data that flows into the user entity 104 may first be received by a router 118, which may then forward the data to a recipient device 120. Recipient device 120 could be a computer, a set top box (STB), a telephone, a television system equipped with network capability, or any other electronic device. Server entity 102 may also comprise a router, switch, or other equivalent device operable to communicate data over a network.

Communication line 122 does not represent a physical connection between server entity 102 and user entity 104. Rather, communication line 122 illustrates that network services are being provided between the two entities.

The multi-layered model for analyzing the survivability of a network may simulate failure of certain elements of a network such as network 100. The multi-layered model, for example, may simulate a failure to repeating entity 112. The model may determine the extent, if any, that network services are adversely affected as a result of a failure of one or more network elements.

In accordance with exemplary embodiments, the multi-layered survivability analysis model may break the physical elements of a network, such as network 100, down into three categories: (1) physical processing elements, (2) physical network elements, and (3) physical infrastructure elements.

Physical processing elements correspond to, for example, processors, network cards, switching fabrics, servers, routers, switches, etc. These are shown in FIG. 1 in at least the indirect routing entity 108, router 118, and recipient device 120. Further, there may be physical processing elements housed at the server entity 102.

Physical network elements may correspond to, for example, fiber links, copper loops, satellite channels, or other suitable mediums for transmitting electronic data. These are shown in FIG. 1 in at least the direct connection 106 between server entity 102 and user entity 104. The data transmission mediums connecting user entity 104 and server entity 102 with indirect routing entity 108 also represent physical network elements. Further, the satellite channels used to transmit satellite data may be classified as physical network elements. The repeating entity 112 and backup repeating entity 114 can be classified as physical network elements to the extent that they repeat or "push" data traveling between the server entity 102 and the indirect routing entity 108.

Physical infrastructure element may correspond to, for example, a conduit, a tower, a building, a manhole, etc. These types of elements are shown in FIG. 1 in at least the server entity 102, the satellite 110, and the wireless receiver and transmitter device 126. Also, any of the communication lines may be inside a conduit, which may be classified as an infrastructure element to the extent that it protects one or more major transmission channel from damage. Additionally, the routing entity 108 may be classified as an infrastructure element to the extent that it may represent a building or other structure housed with a plurality of routers that act as a main hub for a substantial volume of the network traffic. As will be described in more detail below, failures to different categories of physical processing elements may have a different impact on the amount of network services affected.

The direct connection 106 may be the preferred transmission medium between server entity 102 and user entity 104. In some instances, however, the direct connection 106 may not be the preferred transmission means. For example, a failure to direct connection 106 could render that connection inoperable. Alternatively, the direct connection 106 could get overloaded with communications traffic and reach bandwidth capacity. If direct connection 106 is unavailable (e.g, failure, network traffic overload, etc.), communication data may be routed through the satellite 110 or through the indirect routing entity 108.

When server entity 102 and user entity 104 are communicating without interruption or delay, this is known as a successful service instance. A failed or partially failed service instance occurs if server entity 102 and user entity 104 are unable to communicate or if communication is lost for some period of time.

Depending on the geographic distance between the server and user entities 102 and 104, the network may be much more complex than what is indicated in FIG. 1. In a more complex network, data sent between the two entities may have more opportunities to take different hops or divergent routes. For example, the drawing does not necessarily show-to-scale the distance between server entity 102 and indirect routing entity 108. The geographic distance between these two entities may be substantial. The transmission channel between these two entities may therefore be equipped with one or more data repeating entities 112, which are sometimes referred to as relays or repeaters The network 100 illustrated in FIG. 1—while relatively simple—at least illustrates how data may take divergent paths and still arrive at the same destination.

Figure 2:
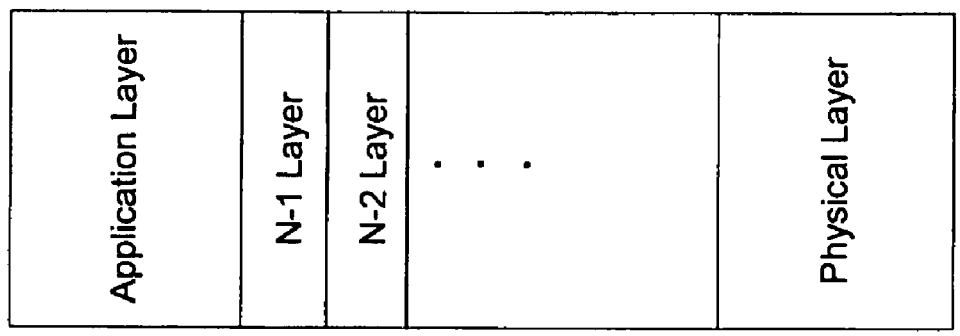
FIG. 2 illustrates multiple layers of a communications network, in accordance with exemplary embodiments.

FIG. 2 illustrates how network communication may be characterized—and thus modeled—in terms of layers. Different communications models may have varying numbers of layers. For example, the ISO/OSI model has seven layers and the TCP/IP model has four layers. FIG. 2 illustrates a model with the number of layers being N-layers. In other words, the multi-layered model developed here may have any number of layers so long as it has at least an application layer and a physical layer.

The application layer provides network services to the end user (e.g. a user in the user entity 104). The application layer interacts with an operating system when a user sends files, reads emails, or performs other network related activities.

The physical layer provides the means for transmitting data over a data communications medium. In other words, the physical layer includes the actual transmission channels over which data travels. Fiber rings, copper networks, and satellite channels are examples of network elements in the physical layer of the network. Some network elements—such as bridges, relays or repeaters—that repeat the data, or "push" the data further along without changing the path, may also operate at the physical layer.

Figure 3:
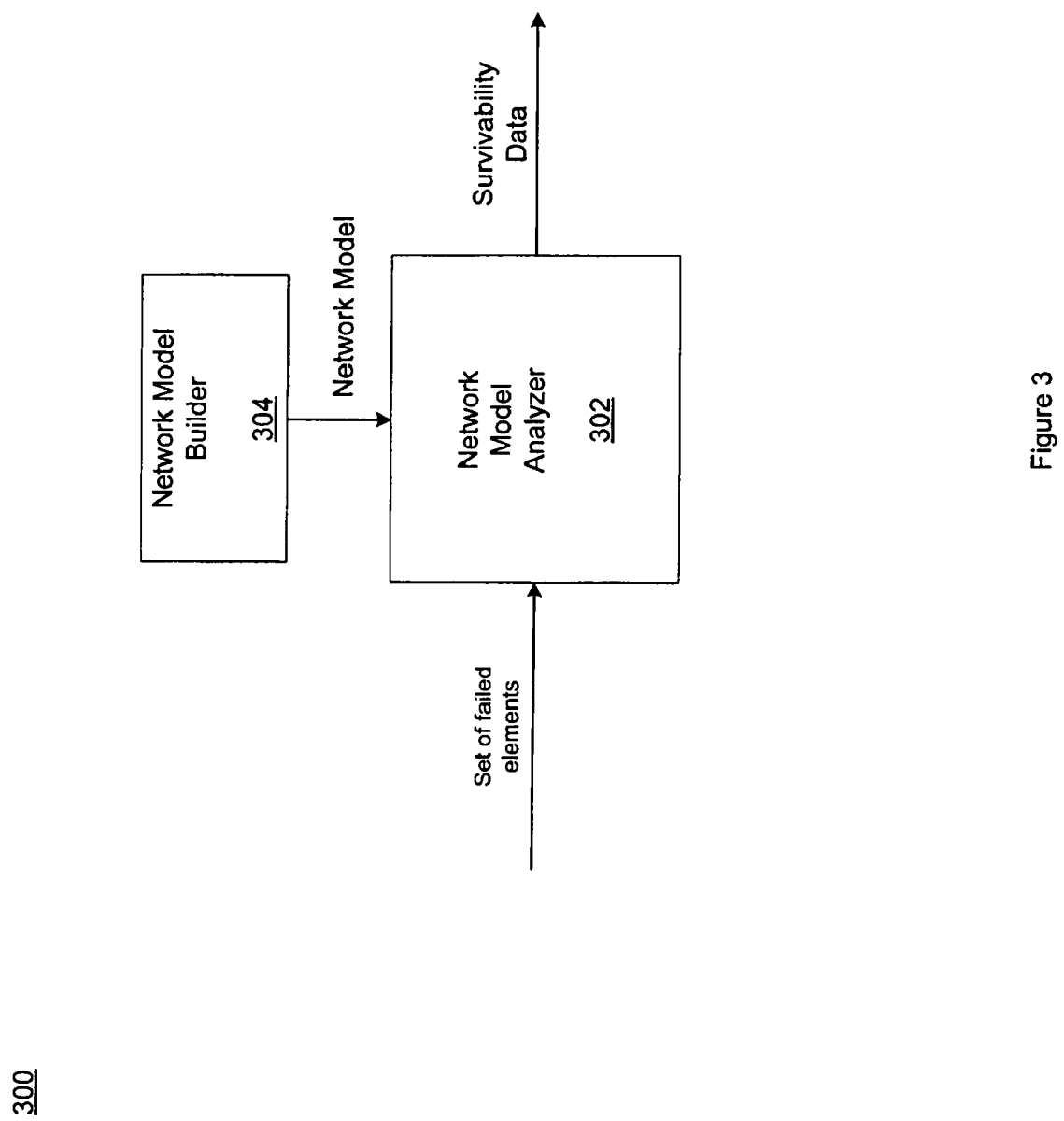
FIG. 3 illustrates a network model builder and a network model analyzer for analyzing survivability of network services, in accordance with exemplary embodiments.

FIG. 3 illustrates a network survivability analysis system 300, in accordance with exemplary embodiments. A network model and a set of failed elements may be input to a network model analyzer 302. The set of failed elements may be projected onto the network model. In other words, the network model analyzer 302 may simulate the failure of one or more physical elements in the network model. The network model analyzer 302 may analyze, calculate and output service survivability data. The network model analyzer 302 may analyze service survivability of a network service by projecting the failure of one or more physical elements onto the model, and then determining the amount of network services affected at the application layer. The amount of service affected at the application layer may depend on the type of physical processing element that has "failed." For example, server entity 102 is an infrastructure element. It provides data services to user entity 104 and possibly many other user networks not illustrated in the figure. If server entity 102 becomes non-operational because of hazardous weather conditions or other possible reasons, the network 100 may experience significant service outage if there is no backup mechanism in place for server entity 102. In contrast, individual computing units 120 are not part of the infrastructure or "backbone" of the system. If a computing element 120 becomes non-operational due to a failure (e.g. a software failure, virus, etc.), the network itself may not experience any other service interruptions.

In accordance with another exemplary embodiment, the network model analyzer 302 may generate a network model on its own, or it may receive a network model from the network model builder 304. The network model builder 304 may be configured to build a network model using several different techniques. In FIG. 3, the network model builder 304 is illustrated as being separate from the network model analyzer 302. However, it should be appreciated that the network model builder 304 may be physically embodied in the network model analyzer 302.

In particular embodiments, the network model builder 304 may build a network model based on file descriptions that define the network. File descriptions that define a network may be input manually or generated automatically. In particular embodiments, the network model builder 304 may be configured to build a network by attaching to an existing network, recognizing the network elements, and creating a model of the network. To recognize the elements of a network, the network model builder 304 may interface with the network management systems and/or the network inventory systems of an existing network. Interfacing with the network management system and/or the network inventory system of a network may allow file descriptions that define a network to be automatically constructed. Interfacing with the network management system and/or the network inventory system may include interfacing with databases associated with the network management system and/or the network inventory system.

In particular embodiments, the network model builder 304 may build the network model through a discovery process that recognizes network elements without regard to an existing network management system and/or network inventory system. For example, the network model builder may use Simple Network Management Protocol (SNMP) to query network devices and to look at the Management Information Bases (MIBs) of each device to ascertain the information and construct the topology of the network. A network model may be constructed based on the results of the queries.

In particular embodiments, the network model builder 304 may build the network model based on an input from a user. For example a user may diagram a network in an application program or graphical user interface, and the network model builder 304 may be configured to convert the information provided by the user into a network model that can be analyzed by the network model analyzer 302.

The network model builder 304 may also provide the network model analyzer 302 with changes or updates to an existing network model.

Figure 4:
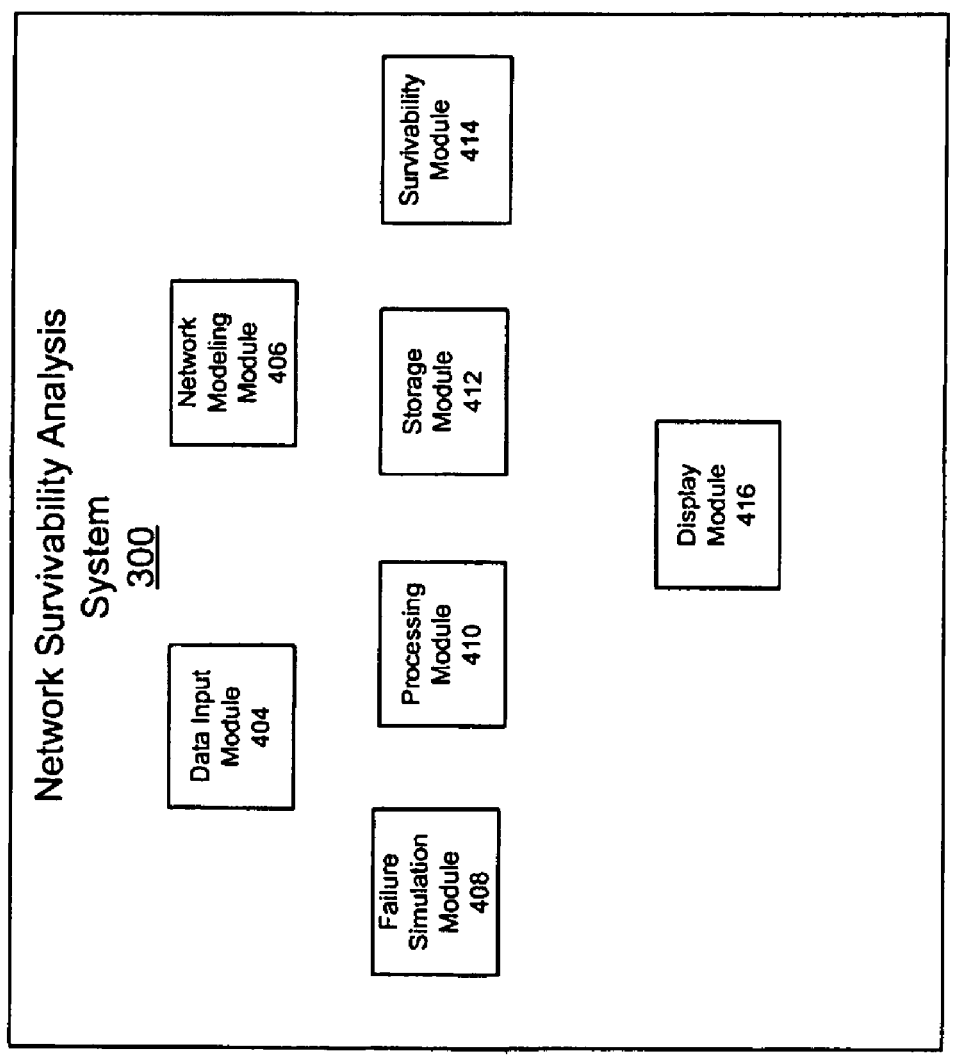
FIG. 4 illustrates exemplary modules of a network model analyzer, in accordance with exemplary embodiments.

FIG. 4 illustrates modules that operate in conjunction with the network model builder 304 and the network model analyzer 302 of the network survivability analysis system 300. In accordance with exemplary embodiments, data input module 404 may receive the network model and sets of failed physical elements as inputs and then perform a simulation and subsequent survivability analysis based on these inputs. In an alternative exemplary embodiment, the data input module 404 and/or the network modeling module 406 may model a network by attaching to the network at some location and creating a network model by using various processes (described in conjunction with the network model builder 304 in FIG. 3 above) to recognize the elements of the network. Once the network model is created, the failure projection module may determine different sets of physical elements that should be simulated as failed.

The network model analyzer 302 may further comprise a processing module 410 for determining the proportion of network services affected by a given set of failed elements. The processing module 410 may be coupled with the failure projection module 408 and the network modeling module 406 to determine the amount of network services affected. A determination of the amount of network services affected may take into account at least one failed element in a network and determines the impact that the at least one failure will have on the network services provided at the application layer. The network model analyzer 302 may comprise a storage module 412 for storing the data representing the proportion of network services affected as that data accumulates during an iteration through the system. The survivability module 414 may analyze the data from the storage module 412 to calculate survivability metrics. In performing these calculations, the survivability module 414 may be communicatively coupled with the processing module 410 and the storage module 412. The display module 416 may cause the display of the results of a network analysis. In addition, the display module 416 may cause the results to be printed.

Figure 5:
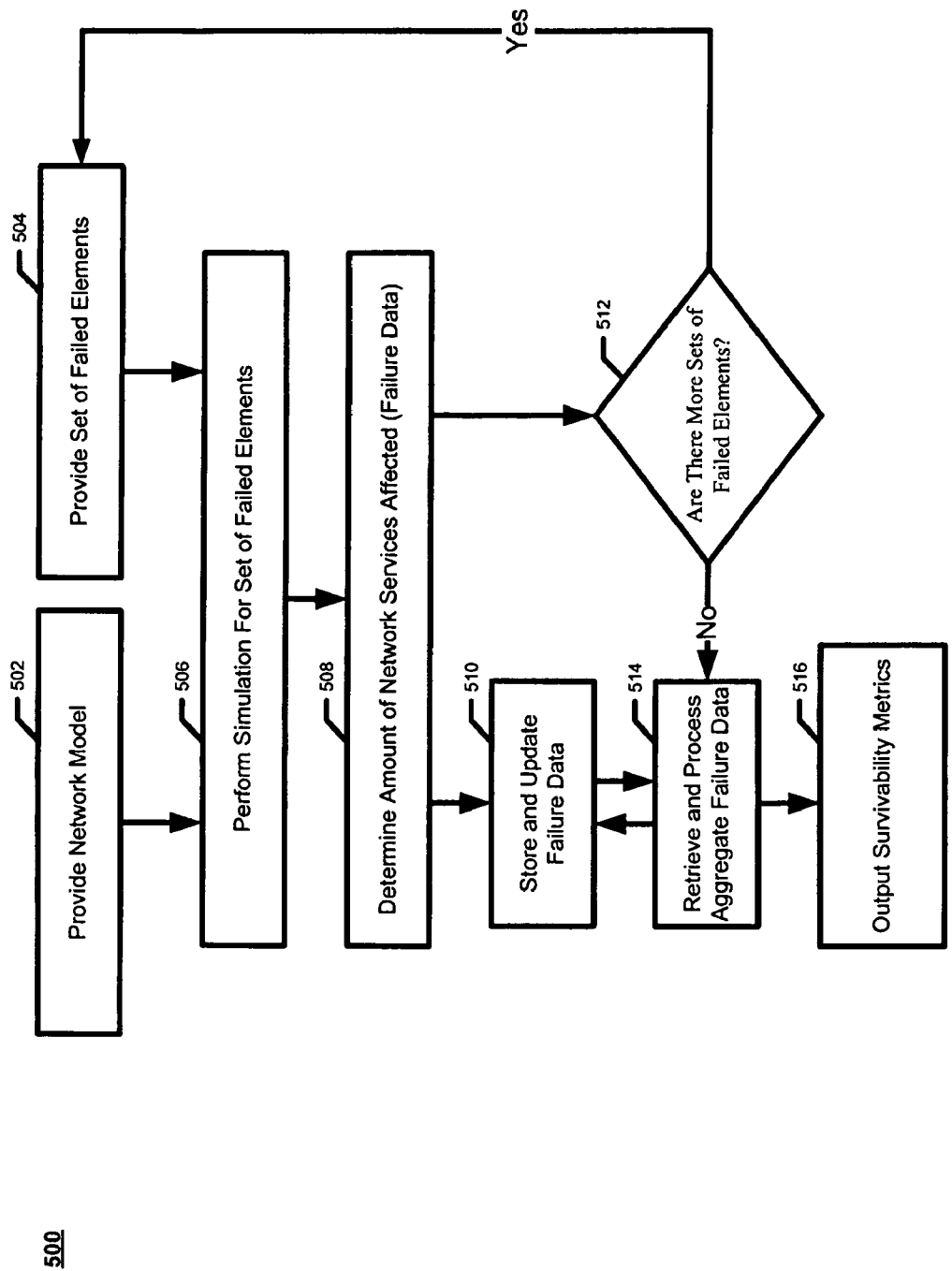
FIG. 5 is a flowchart illustrating how the multiple combinations of failures may be analyzed to determine survivability metrics, in accordance with exemplary embodiments.

FIG. 5 illustrates a method for analyzing all the sets of possible failure combinations iteratively to produce survivability metrics, in accordance with exemplary embodiments. This exemplary method is provided by way of example, as there are a variety of ways to carry out methods disclosed therein. The method 500 shown in FIG. 5 can be executed or otherwise performed by one or more combinations of various systems. The method 500 is described below as carried out by the network model analyzer 302 and network model builder 304 as illustrated in FIGS. 3 and 4 by way of example. Various elements of the network survivability system 300 are referenced in explaining the exemplary methods illustrated in FIG. 5. Each block shown in FIG. 5 represents one or more processes, methods, or subroutines carried out in the exemplary method 500. The method may be automated.

In block 502, a network model is provided. The network model may be input from the network model builder 304 into the network model analyzer 302 as shown in FIG. 3. In another embodiment, the functions of the network model builder 304 may be embodied in the network model analyzer 302, and the network model may be created internally within the network model analyzer 302.

In block 504, one or more sets of failed elements are provided. The one or more sets of failed elements may be input to the network model analyzer 302, created internally within the network model builder 304 or created internally within the network model analyzer 302. The one or more sets of failed elements can include failed network elements, including but not limited to, physical processing elements, physical network elements, and physical infrastructure elements.

In block 506, a simulation for a set of failed elements may be performed. This simulation may be performed by the network model analyzer 302. The simulation requires an analysis of the failed elements to determine whether these failed elements are backed-up. If an element is not backed-up, the simulation may analyze and determine the additional network elements that may be adversely effected as a result of the failure. This analysis is performed for each failed element in the set of one or more failed elements. The process of analyzing each element is further illustrated in FIG. 6.

In block 508, the amount of network services affected may be determined for a given set of one or more failed elements. The network model analyzer 302 makes this determination. After the failures of elements in block 506 are analyzed, network model analyzer 302 may determine whether the network may have to navigate communication data over fewer communication paths than originally existed. In some instances, all communication paths may be non-functional and a service interruption may occur. In other instances, communication might not be interrupted, but the decrease in the available communication paths may decrease available bandwidth and network services may be delayed or partially interrupted. Block 508 outputs the amount of network services affected.

In block 510, the data determined from block 508—which represents the amount of network services affected for a given set of one or more failed elements—is stored. More iterations of the method 500 may be performed, and so the initially stored data may be updated. In other words, different combinations of failed elements may be analyzed iteratively, and so block 508 may determine different data for different sets of failed elements. Block 510 illustrates that this additional data is stored and updated. The storage module 412 of the network model analyzer 302 may store this data and may be configured to update the data if it is input in an iterative fashion.

In block 512, the method 500 determines whether there are more sets of failed elements that need to be simulated and analyzed. For example, the question in block 512 may be answered in the affirmative until all possible combinations of failed elements are simulated and analyzed. The network modeling module 406 of the network model analyzer 302 may be configured to make this determination, or may be configured to communicate with another module of network model analyzer 302 to make this determination.

In block 514, the stored analysis information is retrieved and the failure data is aggregated to calculate (quantify) survivability metrics. For example, the network model analyzer 302 retrieves this stored data aggregate failure data and processes the data to calculate survivability metrics.

In block 516, the calculated survivability metrics may be output by causing data representing the survivability metrics to be displayed on a display device or sent to a printing device. For example, display module 416 of network model analyzer 302 may be configured to cause this data to be displayed or sent to a printing device.

The survivability metrics may represent, for example, survivability metrics such as the average, minimum, maximum, median, and distribution of service survivability subject to a given number (e.g., 1, 2, or 3) of simultaneous physical element failures. Further, the determination may include an identification of the particular combinations of physical failures that lead to the worst and/or the Nth worst service survivability. The information produced by the network model analyzer 302 may be used to modify a network topology or architecture, or add backup network elements to mitigate certain adversely affected services that have been identified.

Figure 6:
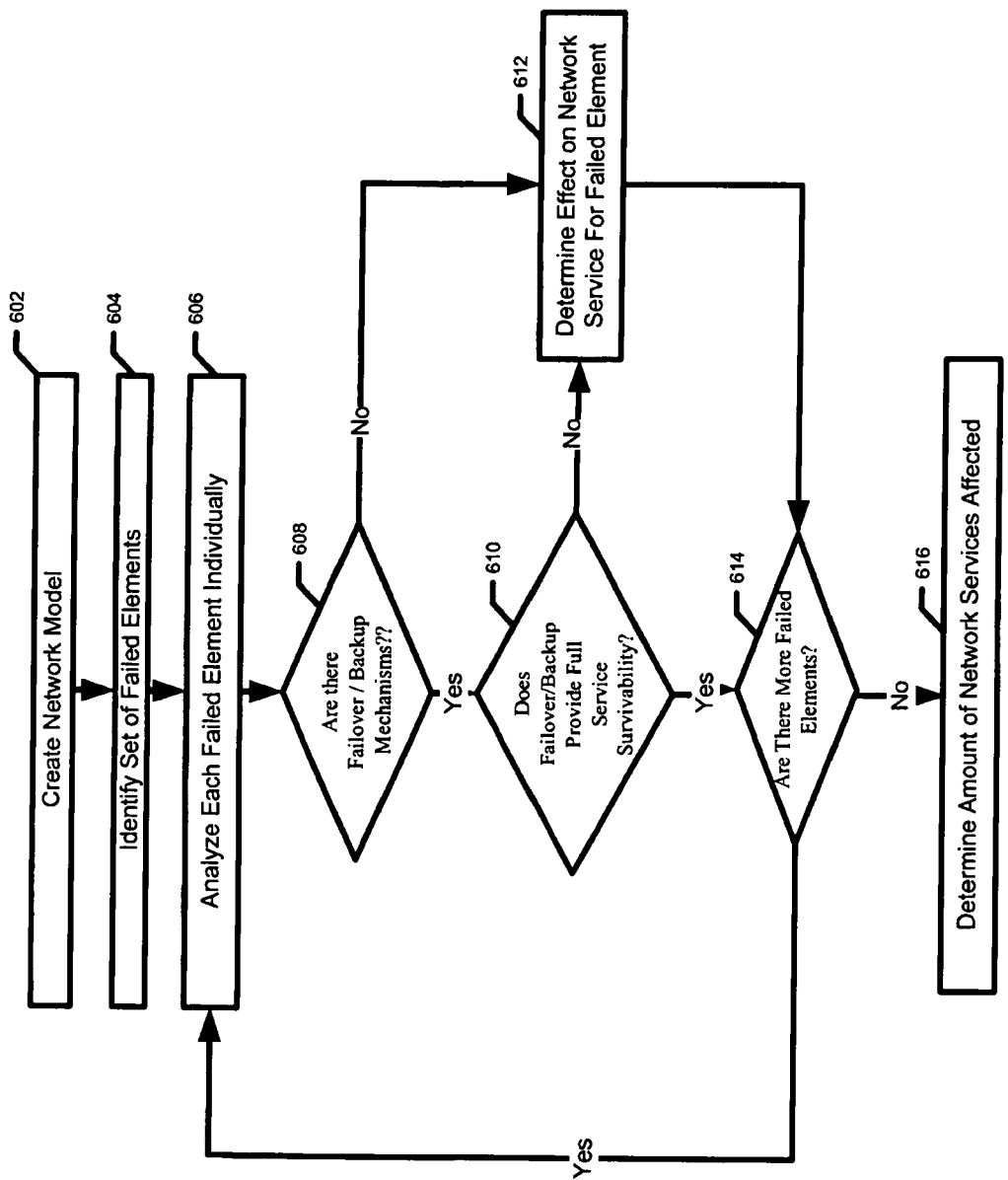
FIG. 6 is a flowchart illustrating how an individual combination of failures may be analyzed to determine the proportion of network services affected, in accordance with exemplary embodiments.

In accordance with exemplary embodiments, FIG. 6 describes a method 600 for performing an analysis of a given set of failed physical processing elements to determine the amount of network services affected. This exemplary method is provided by way of example, as there are a variety of ways to carry out methods disclosed therein.

The method 600 shown in FIG. 6 can be executed or otherwise performed by one or more combinations of various systems. The methods 600 is described below as carried out by the network model analyzer 302 and network model builder 304 illustrated in FIGS. 3 and 4 by way of example. Various elements of the network survivability analysis system 300 are referenced in explaining the exemplary methods illustrated in FIG. 6. Each block shown in FIG. 6 represents one or more processes, methods, or subroutines carried out in the exemplary method 600. The method 600 may be automated.

In block 602, a network model is created. The network model may be input from the network model builder 304 into the network model analyzer 302 as shown in FIG. 3. In another embodiment the functions of the network model builder 304 may be embodied in the network model analyzer 302, and the network model may be created internally within the network model analyzer 302.

In block 604, one or more sets of failed elements are identified. For example, one or more sets of failed elements may be input to the network model analyzer 302 or may be created internally within the network model builder 304 or the network model analyzer 302. The one or more sets of failed elements can include failed network elements, including but not limited to, physical processing elements, physical network elements, and physical infrastructure elements.

In block 606, an individual element is selected for failure. For example, the network model analyzer 302 selects an individual failed element from the one or more sets of identified failed elements. Each of these individual failed elements are analyzed to determine how network services may be affected. The network model analyzer 302—as it analyzes each failure—may take into account other failed physical elements. This may allow the network model analyzer, as it performs a simulation, to know whether one of the other failed elements is a backup for the current failed element.

In block 608, backup elements for each identified failed element are determined. For example, the network model analyzer 302 determines whether a failed element has any backup elements. As shown in FIG. 1, backup repeating entity 114 is a backup to repeating entity 112. Thus, an outage to repeating entity 112 alone may not have any significant impact on network services. However, if repeating entities 112 and backup repeating entity 114 are both non-operational, that may eliminate the possibility of transferring data through the routing entity 108. This in turn may cause increased network traffic to flow through direct connection 106 and the satellite 110.

It follows that determining an answer to the question posed in block 608 may require more than a single analysis of an adjacent element. In the above example, with the failed repeating entity 112, the network model analyzer 302 may look first for functionality at the backup repeating entity 114. But even if the backup relay element 114 is not functional, network services might not be interrupted if the other two transmission channels are functioning. The search for backups/failovers may also include analyzing the condition of a lower layer. If a physical element is non-operational, then the corresponding entity is defined to be in a failed condition. For example, the connection between server entity 102 and indirect routing entity 108 that includes a failed entity, such as repeating entity 112, is defined to be in a failed condition itself, unless it is being protected by an operational backup.

A higher-layer, logical connection that includes a failed connection at a lower layer is in a failed condition itself, unless the higher layer connection is protected by an operational backup. For example, a logical connection between server entity 102 and user entity 104 may determine that, because of failures to the other communication paths, network data should be navigated through indirect routing entity 108. If this were the case, the logical connection would be failed if the network model analyzer 302 determined that repeating entity 112 and backup repeating entity 114 were both non-operational. On the other hand, if more than one communication path were available, the logical connection between server entity 102 and user entity 104 would not be failed—and network services could avoid interruption—because the logical connection could be routed through a different communication path (i.e., the logical connection had an operational backup). In this scenario, the logical connection would not be failed or partially failed if the logical connection could be navigated through direct connection 106 or satellite 110.

In block 610, the functionality of a backup mechanism is analyzed with respect to the requirements of the network as a whole. For example, the network model analyzer 302 analyzes the backup mechanism to determine the volume of network traffic it can process. Further, the backup mechanism may be analyzed with respect to processing speed. Using this information, the network model analyzer 302 may determine that network services are still available, but that the network services may be slower or less reliable because of limitations associated with the backup mechanism. If the backup mechanism is fully functional and operable to process the entire volume of network traffic, the network model analyzer may determine that there is no adverse effect on network services. This analysis may be performed for each element of the set of failed elements and the network model analyzer determines the amount of network services affected at the application layer.

In block 612, the effect on network services for the failed element may be determined. This determination may be based in part on the analysis described above in reference to blocks 608 and 610. The network model analyzer 302 may determine the effect on network service based on the condition of the element (e.g. operational, non-operational, or partly operational), and further based on the availability and capability of backup elements or alternative communication paths that avoid an element that isn't fully operational.

In block 614, it is determined whether there are more failed elements in a given set of failed elements that have not yet been analyzed. For example, the network model analyzer 302 determines if there are still network elements to analyze. If so, the flowchart will proceed to block 606 and the network model analyzer 302 will analyze the next failed element. If not, the flowchart will proceed to block 616.

In block 616, the amount of network services affected is determined. This determination occurs after all of the elements in a given set of one or more failed elements have been analyzed. Figure, blocks 612 and 616 may be communicatively coupled to one another so that the determination of the amount of services affected for a set of one or more elements is based on the effect on network service of each failed element. The network model analyzer 302 may rely on a plurality of the modules shown in FIG. 4 in order to make this determination.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
receiving a multi-layered network model of a data communications network comprising network elements and network services;
receiving at least one set of one or more network elements to determine effects of a failure of each set of the at least one set of one or more network elements;
simulating the data communications network and failures of each set of the at least one set of one or more network elements to determine whether the each failed set of the at least one set of one or more network elements are backed-up;
quantifying service survivability metrics of the effects on network services caused by the failure of each set of the at least one set of one or more network elements based at least in part on a determination that the each failed set of the at least one set of one or more network elements are not backed-up; and
outputting data representing the quantified service survivability metrics of the data communications network.

2. The method of claim 1, wherein simulating the data communications network and failures of each set of the at least one set of one or more network elements further comprises simulating failures of combinations of network elements for each set of the at least one set of one or more network elements and quantifying service survivability metrics of the effects on network services caused by each combination of the failed network elements.

3. The method of claim 2, further comprising determining combinations of network element failures that lead to a predetermined number of worst instances of service survivability.

4. The method of claim 1, wherein the multi-layered network model comprises at least a higher layer application layer and a lower layer physical layer.

5. The method of claim 4, wherein the network services are modeled by sets of communicating entities at the application layer, wherein the communicating entities are communicatively coupled by connections at an underlying layer.

6. The method of claim 5, wherein a connection failure at an underlying layer results in a failure at each layer higher than the underlying layer.

7. The method of claim 4, wherein the quantifying service survivability metrics of effects on network services caused by the failure of each set of the at least one set of one or more network elements is based at least in part on the extent of service interruptions at the application layer.

8. The method of claim 1, wherein quantified service survivability metric is one or more of an average service survivability, minimum service survivability, maximum service survivability, median service survivability, or distribution of service survivability.

9. The method of claim 8, wherein the quantified service survivability metrics correspond to failures of multiple network elements occurring simultaneously.

10. The method of claim 1, wherein the simulation of failed network elements comprises data indicating whether each network element in the model is operational or non-operational.

11. The method of claim 4, wherein a connection above the physical layer comprises a connection between at least two entities in that layer, and a connection with the layer below.

12. The method of claim 2, wherein every possible combination of failed network elements of a data communications network are simulated and quantified in an iterative fashion.

13. The method of claim 1, wherein network elements comprise physical and logical elements operating at any layer in the multi-layered model.

14. A non-transitory computer readable medium storing an executable program comprising instructions to perform the method of claim 1.

15. A system comprising:
a network modeling module configured to provide a multi-layered network model of a data communications network that represents at least network elements and network services of the data communications network;
a failure simulation module configured to simulate a failure of one or more sets of one or more network elements in the multi-layered network model to determine whether the failed one or more sets of one or more network elements are backed-up;
a survivability module comprising at least one computing device configured to determining survivability data including effects on network services caused by the failure of each set of one or more network elements based at least in part on a determination that the failed one or more sets of one or more network elements are not backed-up; and
a display module configured to output survivability data.

16. The system of claim 15, wherein the survivability module is further configured to determine quantifiable service survivability metrics of the data communications network by analyzing the effects of failures of each set of one or more network elements of the data communications network.

17. The method of claim 16, wherein the survivability module is further configured to determine combinations of network element failures that lead to a predetermined number of worst instances of service survivability.

18. The system of claim 16, wherein the survivability module is further configured to determine quantifiable service survivability metrics of the data communications network by analyzing the effects of failures of different combinations of network elements of the data communications network.

19. The system of claim 18, wherein the survivability module is further configured to determine quantifiable service survivability metrics of the data communications network by analyzing the effects of failures for every possible combination of failed network elements of the data communications network in an iterative fashion.

20. The system of claim 16, wherein the quantifiable service survivability metric is one or more of an average service survivability, minimum service survivability, maximum service survivability, median service survivability, or distribution of service survivability.

* * * * *